United States Patent [19]
Albrecht

[11] 4,029,407
[45] June 14, 1977

[54] FADING MECHANISM FOR SLIDE PROJECTORS WITH AUTOMATIC FOCUSING MEANS

[75] Inventor: Hermann Friedrich Albrecht, Hotzum, Germany

[73] Assignee: Rollei-Werke Franke & Heidecke, Braunschweig, Germany

[22] Filed: May 5, 1976

[21] Appl. No.: 683,514

[30] Foreign Application Priority Data

May 16, 1975 Germany ............................ 2521760

[52] U.S. Cl. .................................. 353/86; 353/101
[51] Int. Cl.² ........................................ G03B 3/10
[58] Field of Search ................. 353/69, 83, 86, 90, 353/101; 352/140

[56] References Cited
UNITED STATES PATENTS 3,601,482  8/1971  Harvey ............................. 353/101
3,861,794  1/1975  Sobotta ............................ 353/101

*Primary Examiner*—Harry N. Haroian
*Attorney, Agent, or Firm*—Stonebraker, Shepard & Stephens

[57]  ABSTRACT

A picture slide projector having provision for automatic focusing (i.e., provision for automatically keeping the projection lens and the picture slide at a constant distance from each other notwithstanding a buckling displacement of the slide under the influence of heat) is provided with means for moving the projection lens axially relative to the picture slide, to an out-of-focus position to produce a fading or dissolving effect on the viewing screen, while the slide is being withdrawn from the slide holder or gate and replaced by another slide. At the same time, the automatic focusing mechanism is rendered inoperative. Preferably also at the same time, the projection lamp is dimmed. When the slide changing operation is completed, the automatic focusing mechanism is rendered operative, and it serves to bring the projection lens back axially to the sharp focus position, the projection lamp being simultaneously brightened.

9 Claims, 1 Drawing Figure

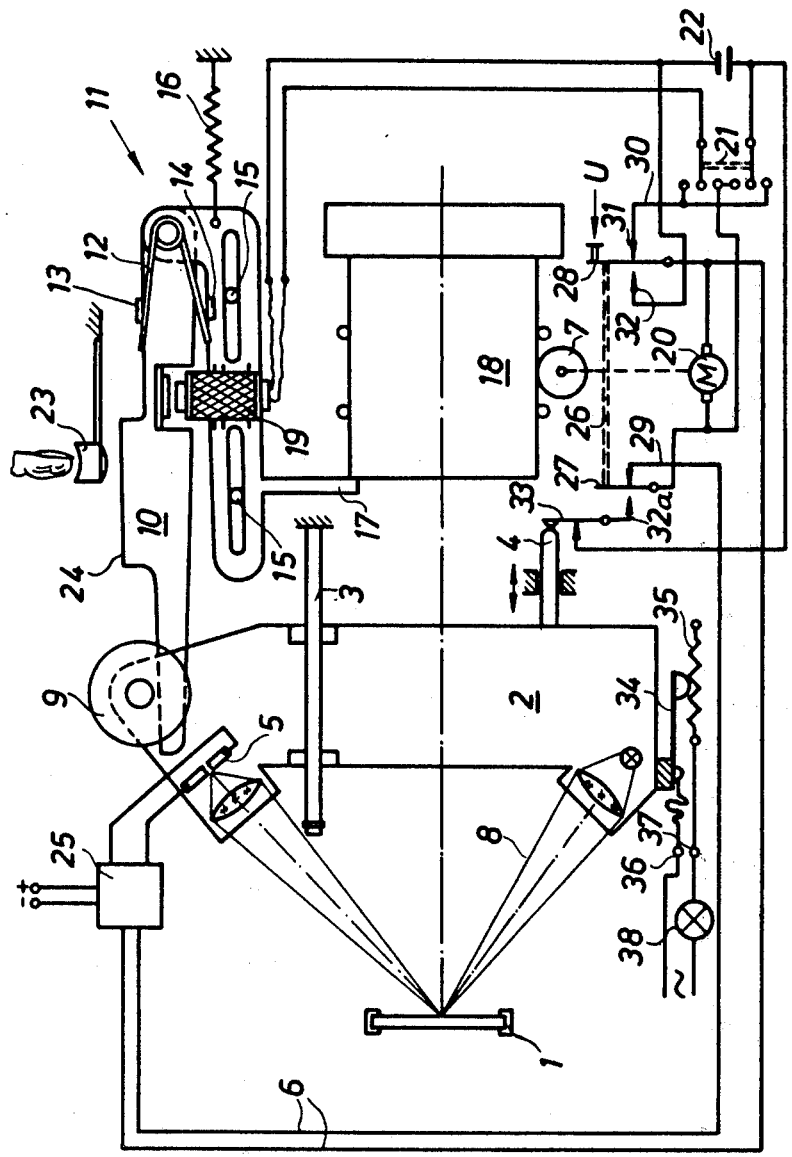

FADING MECHANISM FOR SLIDE PROJECTORS WITH AUTOMATIC FOCUSING MEANS

BACKGROUND OF THE INVENTION

The invention relates to the field of projectors for projecting picture slides or diapositives onto a viewing screen, and particularly to such projectors which have means for so-called automatic focusing. Automatic focusing, in this sense, refers to mechanism for keeping the projection lens and the central portion of the picture slide or diapositive at a constant distance from each other, notwithstanding the fact that, under the influence of heat from the projection lamp, the picture slide may buckle while it is in the projection position or projection gate. Of course the automatic focusing mechanism does not really focus the image on the screen automatically, and this must be done by the operator when the projector and screen are initially set up. But after the projection lens has been adjusted to a sharp focus position, depending on the distance of the viewing screen from the projector, the automatic focusing mechanism will thereafter be effective to keep the image on the screen in sharp focus, notwithstanding possible buckling of the picture slide while it is being projected.

Various different kinds of projectors of this general type are known in the art. They are often used in pairs, set side by side and projecting on the same screen, and are controlled, either manually or by a known form of automatic control, in such manner that while a picture is being projected on to the screen by one projector, the slide is being changed in the other projector, and then the picture from the first projector fades out while the picture from the newly inserted slide in the second projector fades in. The present invention relates to an improved form of fading mechanism, utilizing the focusing motor to shift the projection lens to a non-focused or fading position, preferably with simultaneous dimming of the projection lamp, and utilizing this same focusing motor plus other portions of the automatic focusing mechanism to bring the projection lens back to the proper sharp focused position, simultaneously brightening the projection lamp if it has previously been dimmed. With the present invention, no additional motor is needed to produce the fade-out or blurred focusing effect.

Although the invention is particularly useful when employing twin projectors as above mentioned, it is also useful when only a single projector is used. The present invention enables the changing of slides in a visually pleasing manner, without excessive brightness fluctuations on the viewing screen when a slide is being changed.

BRIEF DESCRIPTION OF THE DRAWING

The SINGLE VIEW is a schematic representation of a projector according to a preferred embodiment of the invention, illustrating mechanical parts in schematic form and providing a wiring diagram for the electrical circuitry.

DESCRIPTION OF THE PREFERRED EMBODIMENT

The present invention may be applied to various kinds or forms of projectors having provision for automatic focusing, and especially to a projector of the kind where a single motor is used both for initial focusing of the image on the viewing screen and for corrective or automatic focusing to keep the image in sharp focus notwithstanding buckling of the picture slide. As a convenient example of a projector of this kind, to which the present invention may be applied, reference is made to U.S. Pat. No. 3,861,794, granted Jan. 21, 1975 for an invention of Sobotta. The drawing of the present application is substantially a duplicate of the drawing in the Sobotta patent, with the additional features of the present invention added thereto.

For the features carried forward from the Sobotta patent to the present application, the same reference numerals are used as in the Sobotta patent, namely, numerals 1 through 25, inclusive. For these parts 1 through 25, a very brief description will suffice in the present application, the reader being referred to the Sobotta patent for a more detailed description of these parts and their mode of operation. The parts bearing the numerals 26 through 38 are the parts which, according to the present invention, are added to the basic projector structure, and these added parts will be described in somewhat greater detail.

Referring now to the basic structure of the projector, the picture slide or diapositive in projection position is indicated at 1. A sliding carriage 2, movable in the direction of the optical axis and guided by guiding members 3 and 4, is provided with two photo-electric cells 5 operatively connected with the focusing motor 20 via a connecting circuit 6. The motor, acting through a slip clutch 7, drives the projection lens 18 in one direction or the other along the optical axis.

The automatic focusing ray 8, derived from a lamp and a lens mounted on the carriage 2, is directed approximately toward the center of the picture slide 1, hitting it at an oblique angle, and is reflected thereby to be picked up by a lens in front of the photocells 5. When the reflected ray falls exactly between the two cells 5, they are activated either not at all or both to the same extent, so that the motor 20 is not operated. When the reflected ray falls more on one of the photocells than on the other, current of one polarity or the other will be supplied to the circuit 6 leading to the motor 20, to cause the motor to turn in one direction or the other to drive the projection lens 18 axially forwardly or rearwardly.

The automatic focusing slide or carriage 2 is equipped with a slip-free wedge member or pulley 9 cooperating with the wedge shaped upper edge of a coupling lever 10 forming part of a displaceable coupling slide indicated in general at 11. The forward end of this lever 10 is pivoted to a member 14 having guide slots engaging fixed guide pins 15, the slots extending parallel to the optical axis of the projector. A hairpin spring 12, reacting against a lug 13 on the lever 10 and a corresponding lug on the member 14, tends to keep the wedge portion of the coupling lever tightly engaged with the cooperating wedge portion of the member 9 on the carriage 2. A spring 16 tends to pull the entire coupling carriage assembly 11 forwardly to keep a lug or abutment 17 thereon engaged with the rear edge of the mount 18 of the projection lens.

Carried on the member 14 is an electromagnet 19 which, when energized, pulls downwardly on an armature on the pivoted lever 10, to overcome the force of the spring 12 and to disengage the lever 10 from the member 9 on the carriage 2. The circuit of this electromagnet 19 goes to a pole changing switch 21, and the circuit includes a suitable source of direct current, such as the battery 22. By operation of the switch 21, current can be supplied in one direction or the other to the motor 20, to cause the motor to turn in one direction or the other in order to move the projection lens mount 18 axially forwardly or rearwardly, and at the same time the operation of the switch 21 provides current to the circuit leading to the magnet 19 so that this magnet draws the lever 10 downwardly (when viewed as in the drawing) to disconnect the coupling between the slide 11 and the carriage 2. In this way, the motor 20 may be used to focus the projection lens 18 for any given distance of the viewing screen from the projector, without moving the carriage 2 which carries the automatic focusing beam parts. The disconnection of the coupling can also be accomplished manually by finger pressure exerted downwardly on a press button 23, the lower end of which engages a flat upper surface 24 on the lever 10. This has the same effect as energizing the magnet 19.

Relays and control mechanism 25 of conventional design are provided in the circuit from the photocells 5 to the motor 20.

These parts 1 through 25, briefly described above, are described in somewhat greater detail in the above mentioned Sobotta Pat. No. 3,861,794, and the operation of those parts is fully explained in the patent. These parts may be referred to as the basic projector structure to which the present invention is applied, although the invention may be used also with other kinds of projectors, not necessarily of the same construction disclosed in the patent and described above.

According to the present invention, the projector is provided with a double pole change-over switch indicated in general at 26, having contact springs 27 and 28, respectively connected to opposite sides of the circuit of the motor 20, as schematically shown in the wiring diagram. One side of the circuit line 6 coming from the differential photocell 5 and the current source 25 is connected directly to one side of the motor 20, just as in the above mentioned patent. The other side of the circuit 6, however, is not connected directly to the other side of the motor 20, but is connected to the motor through the contact spring 27 of the change-over switch 26. When the change-over switch is in the position illustrated in the wiring diagram, in what may be called its forward position, the connection of the second side of the circuit 6 to the second side of the motor 20 is complete, through the contact spring 27 and the contact member 29. In this same position of the change-over switch 26, certain contacts (as illustrated) of the pole-changing switch 21 are connected through the conductor 30 and contact 31 and contact spring 28 to the first side of the motor 20. In other words, with the change-over switch 26 in the position illustrated, the circuits are established in the same way as in the above mentioned Sobotta patent, and will operate in the same way as described in that patent, the automatic focusing beam 8 in combination with the differential photocell 5 being effective to drive the motor 20 one way or the other to maintain a fixed distance between the center of the picture slide 1 and the projection lens 18, and also the switch 21 can be used to disconnect the coupling 9, 10 and drive the motor to move the projection lens to obtain proper focus in the first instance, or to focus upon a screen moved to a different distance from the projector.

However, if the change-over switch 26 is moved to its other or rear position (to the left as illustrated in the drawing) by pressure applied to the switch in the direction of the arrow U (either manually, or by any suitable automatic control mechanism, such as pressure exerted by a cam) then a different situation exists in the electrical connections. A contact between the parts 28 and 31 is broken, and a contact is established between the part 28 and the contact member 32 which is connected, as illustrated, to one side of the circuit leading from the battery 22 to the electromagnet 19. At the same time, the contact between the parts 27 and 29 is broken, and contact is established between the member 27 and the contact member 32a which is in circuit with the limit switch 33, and through this switch, to the opposite side of the battery 22. The limit switch 33 is operated by one end of the guide rod 4 of the carriage 2. When the carriage 2 is in its extreme forward position, the limit switch 33 is opened so that the circuit from the contact 32a to the battery 22 is broken or open. When the carriage 2 moves rearwardly, the pressure of the guide rod 4 on the limit switch 33 is removed, and the limit switch 33 closes.

It is desirable also to provide for dimming of the projection lamp as the carriage 2 moves forwardly (along with the projection lens 18) to the fading or unfocused position as described below. For this purpose, a sliding contact 34 is mounted on the carriage 2 (insulated therefrom) and slides on a lamp series resistance 35. Connections 36 and 37, respectively, connect the resistance members 34 and 35 into the circuit of the lamp 38 which provides illumination for the picture slide 1 which is to be projected. The lamp will be brightened or dimmed by the movement of the slide contact 34 as a result of movement of the carriage 2.

The projector is normally provided with conventional slide changing mechanism, not illustrated here because it is well known in the art. This slide changing mechanism is so constructed that, by means of a cam or any other suitable connection, the change-over switch 26 is moved to its left hand position (viewed as in the drawing) at the beginning of a side changing operation and is held in this left hand position throughout the slide changing operation, and is then moved to its extreme right hand position illustrated in the drawing, upon completion of the slide changing operation. The switch remains in the right hand position throughout the projection interval, and is moved to its left hand position again at the beginning of the next slide changing operation.

The operation is as follows: let it be assumed that the image from one picture slide has been projected onto the viewing screen for a desired interval of time, and the slide should now be changed. The slide changing mechanism is set into operation. For purposes of the present invention, it is immaterial whether the slide changing operation is performed manually or automatically, both being well known in the art, and it is immaterial whether this slide changing operation is performed with respect to only a single projector, or whether it is performed as a result of control mechanism which synchronously controls a pair of projectors set up side by side to project images alternately from one and the other. In any event, no matter how the slide change is initiated, the change-over switch 26 is moved from its illustrated right position to its left hand position at the beginning of the slide change operation. This serves to disconnect the automatic focusing circuit 6 from the motor 20, because such circuit is broken when the contact spring 27 moves leftwardly away from the contact 29. At the same time, the contact 28, 31 is broken, so that the pole changing focusing switch 21 no longer has any control over the motor. Likewise at the same time, the contact 28, 32 is made and the contact 27, 32a is made, so that the motor 20 is now connected directly to the battery 22 (or other source of direct current) in a direction to move the projection lens mount 18 forwardly along the optical axis. The coupling 9, 10 is effective at this time, so that the carriage 2 moves forwardly along with the projection lens. The movement continues until the guide rod 4 on the carriage 2 engages and opens the limit switch 33, whereupon the supply of current to the motor stops.

This forward motion of the projection lens 18 has the effect of fading or dissolving the screen image of the slide 1, in the sense that the image becomes out of focus and blurred. At the same time, the motion of the slider 34 along the resistance element 35 serves to dim the illumination lamp 38. The parts remain in this position while the slide changing operation takes place.

When the slide changing operation has been completed and it is time to project the new slide which is now in the position illustrated at 1, the change-over switch 26 is allowed to return to its normal projection position, that is, the right hand position or position illustrated in the drawing. This re-establishes the connection from the automatic focusing circuit 6 to the motor 20, opening the contacts 28, 32 and 27, 32a, and closing the contacts 27, 29 and 28, 31. The automatic focusing mechanism then takes over control of the motor 20, and operates just as described in the above mentioned Sobotta patent, to restore the carriage 2 and projection lens 18 to a position in which the automatic focusing beam 8 impinges centrally on the differential photocell or twin photocells 5. The automatic focusing means continues to operate to keep the image in sharp focus if the slide happens to bulge or buckle while it is being projected. At the same time that the carriage 2 and lens 18 are moved rearwardly toward the proper sharp focus position, the sliding contact 34 slides over the resistance 35 and the projection lamp 38 brightens. The rearward motion of the carriage 2 has allowed the limit switch 33 to close. The manual focusing switch 21 is effective once more, and can be used to refocus if necessary.

The application of this invention to double fading projectors presupposes that each of the two projectors will be equipped with the system of the present invention. This will enable effective use of the twin projectors for projecting alternately from two stacks or magazines of slides, without the necessity of any additional measures, apart from the alternating switch-over device or fading device which is in any case already present in the double fading projectors. As the image changing mechanism of the projector in any case follows the cycle of a cam or similar device, it is desirable for the change-over switch 26 to be incorporated, in accordance with its function, in the said image changing cycle.

What is claimed is:

1. A slide projector comprising means for holding a picture slide in projection position, a projection lens member movable in the direction of its optical axis for projecting an image of said slide onto a viewing screen, a motor for moving said lens member axially, electro-optical scanning means for controlling said motor to move said projection lens member to a predetermined axial position of sharp focus with respect to a portion of said slide, a source of current for operating said motor, change-over switch means movable between a first position and a second position, circuit means effective when said switch means is in its first position for operatively disconnecting said motor from said scanning means and operatively connecting said motor to said source of current independently of said scanning means to drive said motor to move said projection lens member to an out-of-focus position substantially displaced axially from said predetermined sharp focus position, and circuit means effective when said switch means is in its second position for operatively connecting said motor to said scanning means to that said scanning means may control said motor to tend to move said projection lens member back from its substantially displaced out-of-focus position to its said predetermined axial position of sharp focus.

2. The invention defined in claim 1, further comprising a lamp for illuminating said picture slide, and means for dimming said lamp as said projection lens member moves toward its said substantially displaced out-of-focus position and for brightening said lamp as said projection lens member moves toward its said predetermined axial sharp focus position.

3. The invention defined in claim 1, further comprising limit switch means for interrupting supply of current to said motor when said projection lens member moves a preselected distance away from its sharp focus position.

4. In a projector for projecting an image of a picture slide onto a viewing screen, the combination of means for holding a slide in projection position, projection lens means axially movable relative to said slide holding means to establish a sharp focus spatial relationship to a portion of a picture slide held in said holding means, automatic focusing means tending to re-establish said sharp focus spatial relationship when said relationship has been dis-established, means for rendering said automatic focusing means inoperative and concomitantly purposely dis-establishing said spatial relationship to a substantial extent sufficient to make the image on a viewing screen noticeably blurred, and means for rendering said automatic focusing means operative while said spatial relationship is thus dis-established so that said automatic focusing means may re-establish said sharp focus spatial relationship.

5. The invention defined in claim 4, further comprising a projection lamp for illuminating the picture slide to the projected, means for dimming said lamp when said spatial relationship is purposely dis-established to blur the image on the viewing screen, and means for brightening said lamp when said sharp focus spatial relationship is re-established by said automatic focusing means.

6. The invention defined in claim 4, wherein said automatic focusing means includes means for projecting a scanning beam obliquely onto said picture slide and receiving and evaluating the scanning beam after reflection from said picture slide, and wherein said means for purposely dis-establishing said spatial relationship includes means for moving said projection lens means and said scanning beam projecting and receiving means axially relative to said slide holding means while maintaining a fixed relationship between said projection lens means and said scanning beam projecting and receiving means.

7. The invention defined in claim 6, wherein said means for projecting and receiving and evaluating said scanning beam are mounted on a carriage axially movable relative to said projection lens means, further comprising disconnectable coupling means coupling said carriage to said projection lens means for joint axial movement.

8. The invention defined in claim 7, further comprising means for disconnecting said coupling means so that said projection lens means may be moved axially independently of said carriage to establish an initial sharp focus relationship, said coupling means thereafter being operative so that said automatic focusing means may control restoring movement of said projection lens means back to the sharp focus relationship when it has been purposely displaced from such relationship.

9. The invention defined in claim 7, further comprising a slide illumination lamp, and means responsive to movement of said carriage for dimming said lamp as said carriage and projection lens means move away from the position of said sharp focus relationship and for brightening said lamp as said carriage and projection lens means move toward the position of said sharp focus relationship.

* * * * *